United States Patent [19]
Leatherman

[11] Patent Number: 5,913,487
[45] Date of Patent: Jun. 22, 1999

[54] RETRACTABLE CABLE SYSTEM

[76] Inventor: Michael Leatherman, P.O. Box 1992, Morgan Hill, Calif. 95038

[21] Appl. No.: 09/061,987

[22] Filed: Apr. 17, 1998

[51] Int. Cl.$^6$ ............................ B65H 75/48; H02G 11/02
[52] U.S. Cl. .................................... 242/378.4; 191/12.2 R
[58] Field of Search ............................ 242/378.4, 388.7, 242/388.8; 191/12.4, 12.2 R, 12.2 A

[56] References Cited

U.S. PATENT DOCUMENTS

| | | | |
|---|---|---|---|
| 665,800 | 1/1901 | Reno | 242/378.4 |
| 3,821,496 | 6/1974 | Malone | 191/12.2 R |
| 4,685,634 | 8/1987 | Schwartz . | |
| 4,705,484 | 11/1987 | Lerner et al. | 439/502 |
| 5,168,969 | 12/1992 | Mayhew | 191/12.2 R |
| 5,372,225 | 12/1994 | Joynes et al. | 191/12.2 R |
| 5,379,903 | 1/1995 | Smith | 242/378.4 |
| 5,669,571 | 9/1997 | Graybill | 242/378.4 |
| 5,690,198 | 11/1997 | Lohr | 191/12.2 R |

*Primary Examiner*—John M. Jillions
*Attorney, Agent, or Firm*—Law Offices of Terry McHugh; Mark Wilson

[57] ABSTRACT

A retractable cable system with multiple cable capability allows electrical conducting cables to be individually extended from and retracted into a cable housing. The retractable cable system includes a housing and multiple cable retractors secured within the housing. The cable retractors contain function-specific electrical cables that have fixed ends and extendible ends. The fixed ends are secured to their corresponding cable retractors with a fixed length of cable extending from the cable retractors. The extendible ends have lengths of cable that can be extended from their corresponding cable retractors to a target device. In the preferred embodiment, the retractable cable system has a housing that is compatible with a standard 19" rack system, individually removable cable-reels, and a mix of cable types and connector types.

11 Claims, 4 Drawing Sheets

RETRACTABLE CABLE SYSTEM

TECHNICAL FIELD

The invention relates to electrical cables and more specifically to retractable cable systems.

BACKGROUND ART

In the performance of live music, public address (PA) systems are used to amplify and coordinate multiple electrical devices such as microphone, speakers, and instruments. Typically, each electrical device has a designated electrical cable that must be connected to the PA system in order for the music to be properly presented. Presently, pre-performance setup requires that multiple electrical cables be individually unwound and connected between the appropriate receptacles or jacks in the PA system and the target electrical device. Unwinding and plugging in multiple cables is time consuming and often results in misconnected cables and/or electrical devices. In addition, once a performance is completed, all of the cables must be disconnected and wound back up by hand.

Retractable cable-reels that contain electrical cables are well known. For example, AC extension cables exist with a retractor casing that enables connecting the AC extension cable between a standard 120 volt wall socket and an electrical device with a standard electrical plug socket. Short-comings with existing retractable cable-reels include that the cable-reels are stand alone devices that allow the use of only one cable at a time, and that the cable-reels are typically only available with standard AC power cables and standard AC power connectors.

An example of a retractable reel system that offers an electrical cable other than an AC power cable is disclosed in U.S. Pat. No. 4,685,634, entitled "Portable Retractable Reel System," issued to Schwartz. Although the Schwartz system may work well for its intended purpose, the system requires the attached cable to be manually reeled and the system does not provide for multiple cables to be utilized simultaneously.

An example of a multiple cable system is described in U.S. Pat. No. 4,705,484, entitled "Power Cable, Wire and Cable Container," issued to Lerner et al. Lerner et al. discloses a system for organizing multiple cables within a container, but the system does not allow a cable to be freely extended and retracted.

What is needed is a retractable cable system that enables the quick and easy connection and disconnection of multiple electronic devices.

SUMMARY OF THE INVENTION

The invention is a retractable cable system with multiple cable capability that allows cables to be individually extended from and retracted into a cable housing. The retractable cable system includes a housing and multiple cable retractors secured within the housing. The cable retractors contain function specific electrical cables that have fixed ends and extendible ends. The fixed ends are secured to their corresponding cable retractors with a fixed length of cable extending from the cable retractors, so that the fixed ends can be plugged into a nearby fixture such as a rack mounted PA system. The extendible ends have lengths of cable that can be extended from their corresponding cable retractors to a target device.

The retractable cable system is operated by pulling the extendible end of a particular cable from the system housing out to a desired length. Once the cable is pulled to the desired length, the cable is released and the cable remains extended during use. To retract the cable, the extendible end of the cable is slowly extended a short distance further, thereby activating the cable retractor's retracting mechanism such that the cable is allowed to automatically retract into the housing.

In a preferred embodiment, the retractable cable system has a housing that is compatible with a standard 19-inch PA system rack. The preferred embodiment has fourteen individually removable cable-reels as the cable retractors, with the cable-reels containing a mix of cable types and connector types to meet the needs of the specific user. For example, a musical band using the retractable cable system may need two AC cables, six speaker cables, four instrument cables, and two microphone cables, all with corresponding connectors. The retractable cable system offers many advantages over existing cable management techniques. First, the cable-reels within the retractable cable system are fully interchangeable to meet the specific needs of a particular user. Second, the retractable cable system provides a neat and organized system for storing multiple cables in a manner that protects the cables from unnecessary wear and tear. Third, the retractable cable system significantly decreases the time required to connect up and break down the typical performance equipment of a musical band.

DETAILED DESCRIPTION

Figure 1:
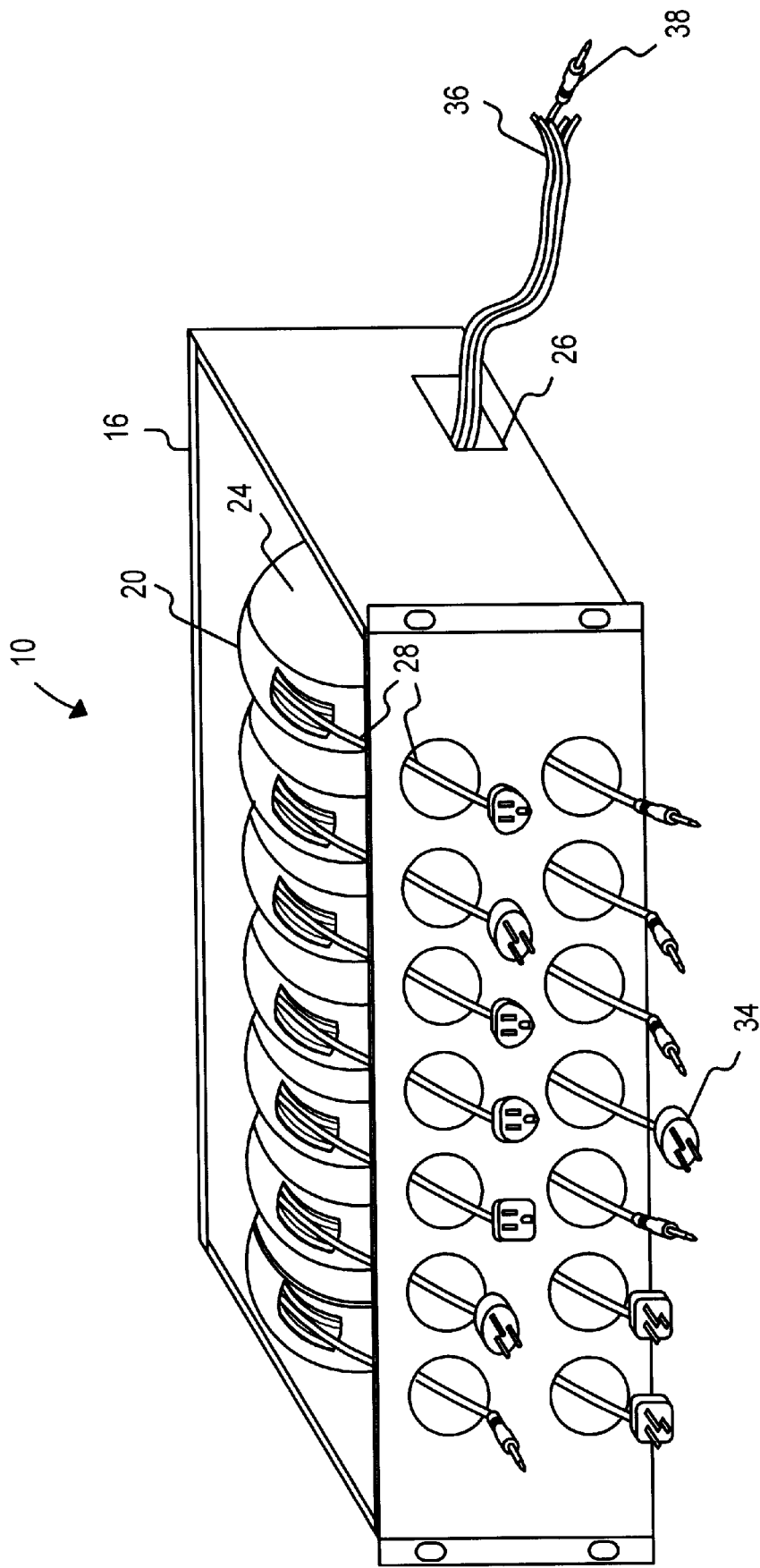
FIG. 1 is a perspective view of a retractable cable system in accordance with the invention.

FIG. 1 is a perspective view of a retractable cable system 10 in accordance with the invention. The retractable cable system includes a housing 16 and a series of cable retractors. In a preferred embodiment, the cable retractors are individually packaged retracting cable-reels 20 that measure approximately 6½ inches in diameter. Each cable-reel in the preferred embodiment includes a plastic circular case 24, a cable retracting mechanism (not shown), and an electrical conducting cable 28 that is wound inside the case and attached to the retracting mechanism. Each cable-reel allows the attached cable to be extended from the case for nearly the entire length of the cable. To extract a cable from a cable-reel, the exposed end of the cable is pulled from the cable-reel case to the desired length. Once at the desired length, the cable is released and the retracting mechanism locks in place, leaving the cable extended at the desired length. To retract the cable, the exposed end of the cable is extended for a short distance with a smooth pulling motion, thereby activating the retracting mechanism within the cable-reel. The cable is then automatically wound up within the cable-reel case. Cable-reels are known that perform in the above-described manner and, as will become obvious to an ordinarily skilled artisan, the exact design of cable-reel is not critical to the invention.

The cables 28 that are attached inside the cable-reels 20 may be any type of cables, and more specifically any type of electrical conducting cable. In the preferred embodiment, the cables within the various cable-reels are a mixed arrangement of cables used with PA systems. For example, the cables may include: standard AC electrical cables such as three-conductor unshielded cable, microphone cables such as two-conductor shielded cable, speaker cables such as two-conductor unshielded cable, and/or instrument cables such as one conductor shielded cable. Other designations of cables may include five, seven, nine, or eleven pin Midi cable. The length of the cable can vary. In a preferred embodiment, the cables can extend up to 21 feet from the housing.

The cables in the retractable cable system 10 have appropriate connectors 34 and 38 on each end of the cable. On the extendible ends of the cables, the connectors 34 are device-compatible connectors. In the preferred embodiment, for example, the type of connector needed depends on whether a cable will be plugged into an AC outlet, a microphone, a speaker, or an instrument, etc. On the fixed ends of the cables, the connectors 38 are compatible with the receptacles in a PA system. Compatible connectors may be mono or stereo, male or female and include but are not limited to standard ¼-inch connectors, RCA connectors, ⅛-inch connectors, and XLR microphone connectors.

The cable-reel housing 16 may have multiple configurations, depending on the particular application of the retractable cable system. In addition, the materials of construction can be varied depending on the particular application. For example, the housing can be square, rectangular, or circular, and the housing may be constructed of, for example, metal, plastic, or another suitable material. The cable-reels 20 secured within the housing are individually removable so that each cable-reel can be interchanged to meet user-specific needs. As well as being interchangeable, the number of cable-reels contained within the housing can be varied to meet user-specific needs.

Figure 2:
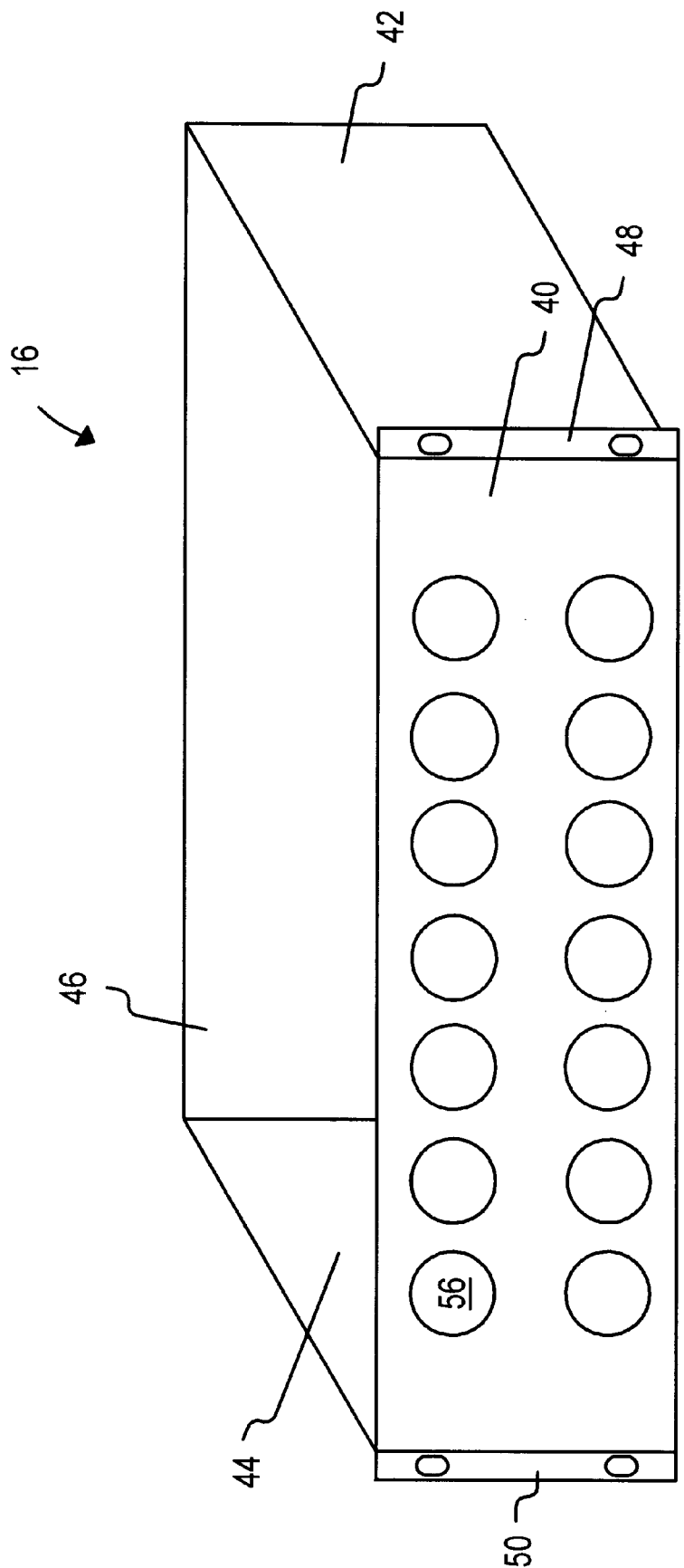
FIG. 2 is a perspective view of a preferred housing in accordance with the invention.

In a preferred embodiment, the housing 16 is a standard 19-inch rack-mountable metal box that can be easily mounted into a standard 19-inch PA system rack. FIG. 2 is a perspective view of a preferred housing 16 in the form of a metal box that is approximately 16¾ inches wide by 8¾ inches in height by 15 inches deep. The metal box has a front wall 40, side walls 42 and 44, and a back wall 46. The front wall 40 of the housing has two rack mount ears 48 and 50 located on each side which allow the housing to be securely affixed to a 19-inch rack.

The preferred housing is designed to contain fourteen individually removable cable-reels and corresponding cables. The front face of the housing has fourteen corresponding holes 56 from which the cables pass. The holes are each approximately 1½ inches in diameter and are spaced apart horizontally along the width of the face by approximately ¾ inch. The holes are spaced apart vertically along the face by approximately 4 inches.

Figure 3:
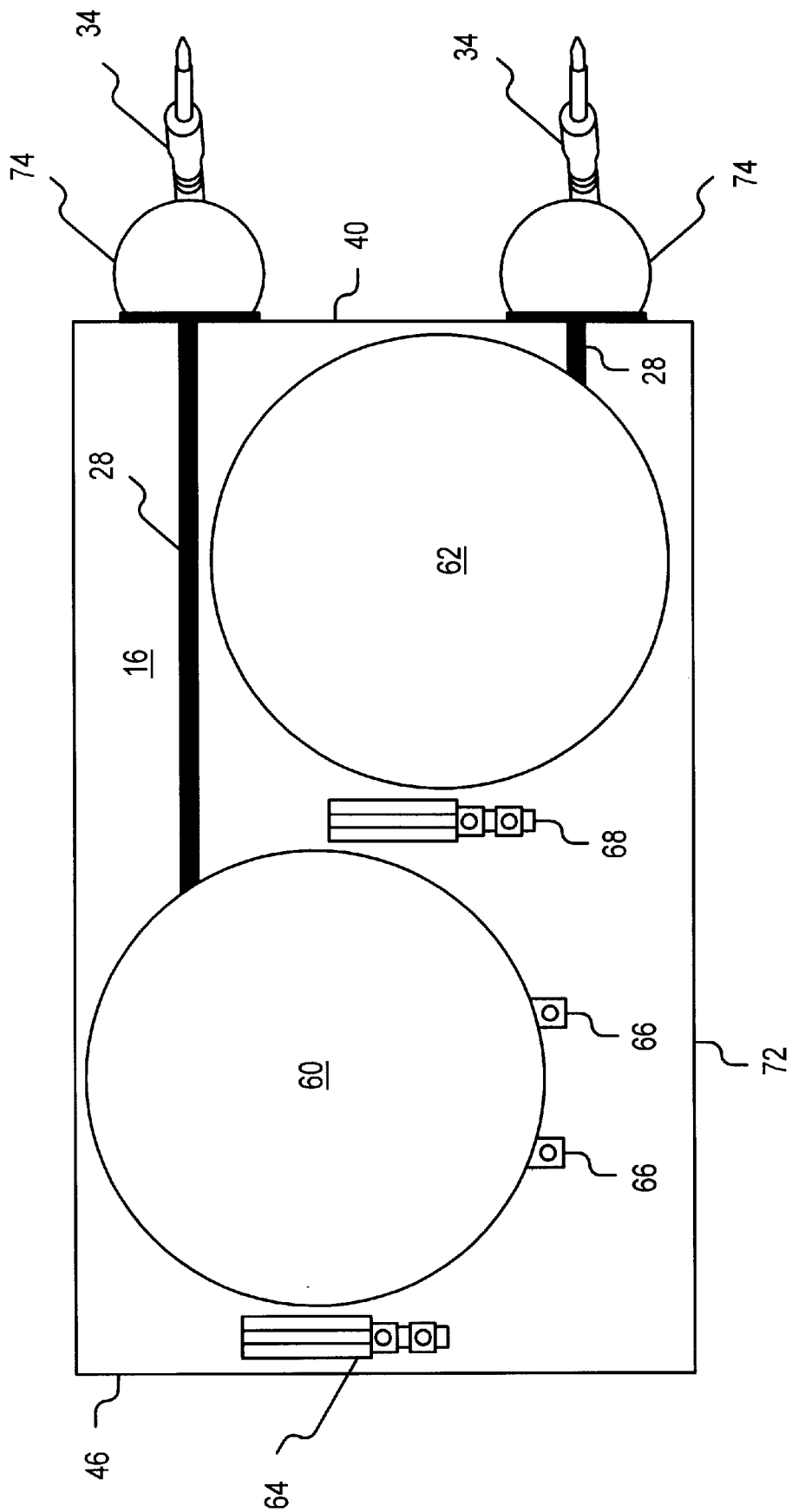
FIG. 3 is a side view of the preferred retractable cable system, showing the locations of two cord-reels within the housing, in accordance with the invention.

FIG. 3 is a side view of the preferred retractable cable system showing the locations of two cable-reels 60 and 62 within the housing 16. Although only two cable-reels are shown, a total of seven cable-reels are arranged side-by-side in each of two rows. The cable-reels in the back row, next to and including cable reel 60, are individually affixed inside the housing to two brackets 64 and 66. The first mounting bracket 64 runs along the back wall 46 of the housing approximately 3 inches from the floor 72 of the housing. The second mounting bracket 66 is attached to both side walls 42 and 44 (not shown) of the housing and spans the housing approximately 3 inches above the housing floor. Each cable-reel in the back row is removably mounted to the first and second brackets 64 and 66 in order to secure the cable-reels within the housing. The back row of cable-reels is located higher than the front row of cable-reels, and the cable openings in the cases are oriented so that the cables extend from the cases near the top of the housing free from contact with the front cable-reels.

The cable-reels in the front row, next to and including cable reel 62, are affixed inside the housing by one mounting bracket 68. The bracket is attached to both side walls 42 and 44 (not shown) of the housing and spans the housing approximately 1½ inches above the housing floor 72 and approximately 6½ inches from the front wall 40. Each cable-reel is removably mounted to the bracket 68 in order to secure the cable-reels within the housing. The front row of cable-reels is located lower than the back row, and the cable openings are oriented so that the cables extend from the cases near the bottom of the housing.

The cables reels 60 and 62 are arranged within the housing 16 so that the cables 28 extend directly to the cable-passable openings parallel to the housing floor and perpendicular to the housing front face. As shown in FIG. 3, stop balls 74 are attached around each cable. The stop balls allow the cables to be extended from and retracted into the housing without letting the connectors 34 on the extending ends pass beyond the front wall 40 of the housing 16. The stop balls have holes through the diameter of the balls that allow the cable to freely pass, but not the connector, and the stop balls are large enough that they will not pass through the housing holes. The stop balls effectively hold the connectors in place when the cables are retracted into the cable-reels. Although stop balls are used, they are not critical to the invention and other mechanisms may be used to prevent the cables from completely retracting into the cable-reels and the housing.

Referring to FIG. 1, the fixed ends 36 of the cables 28 are attached within the cable-reels 20 and extend from the cable-reels in a non-retracting manner. The fixed ends of the cables are collected within the housing 16, where they extend from one opening 26 in one side wall of the housing. The exact location and orientation of the fixed ends of the cables is not critical to the retractable cable system, but it is preferred that the fixed ends have approximately 4 feet of free cable, so that the cables can be connected into the corresponding receptacles of the PA system.

Figure 4:
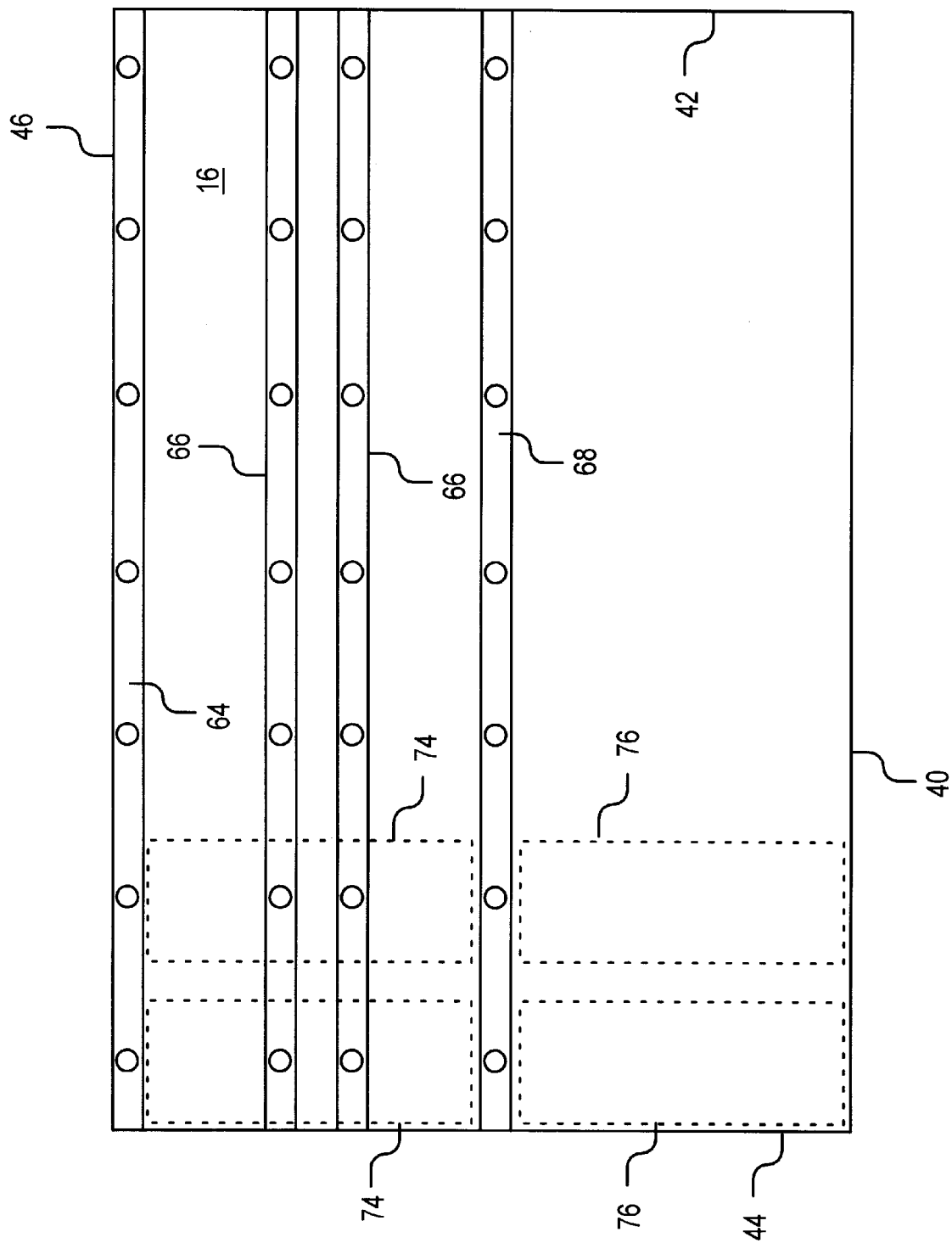
FIG. 4 is a top view of the housing, the mounting brackets, and the outline of four corresponding cable-reels in accordance with the invention.

FIG. 4 is a top view of the housing 16, showing the front wall 40, the back wall 46, the side walls 42 and 44, the mounting brackets 64, 66 and 68, and the outline of corresponding cable-reels 74 and 76. As described above, the cable-reels in the back row 74 are mounted to two brackets 64 and 66 that span the width of the housing. The cable-reels in the front row 76 are mounted to one bracket 68 that spans the width of the housing. The approximate arrangement of the cable-reels is outlined for two cable-reels in each of the front and back rows. Although a particular bracket system is described with reference to the preferred embodiment, other bracket arrangements can be used that allow the cable-reels to be individually removed and that allow the cables to be individually extended from the retractable cable system.

In a preferred embodiment, the cable system is mounted within a PA system rack that is used for public address applications, such as live musical performances. For example, the retractable cable system may be equipped with a selection of AC, microphone, speaker, and instrument cables and connectors that are specific to a particular performing group. The extendible ends of the cables contain all of the band's necessary connectors. The fixed ends of the cables are plugged into the appropriate devices, such as amplifiers and mixers, on the PA system. In order for the group to setup their equipment, the PA system rack containing the PA system and the retractable cable system is positioned on the stage. The appropriate cables from the retractable cable system are individually extended from the rack by pulling the cables to the desired length. Once extended to the desired length, the connectors on the cables are plugged into the corresponding devices. For example, an AC cable is extended to a local AC outlet and plugged in, two speaker cables are extended and connected to left and right speakers respectively, the microphone cable is extended and connected to a microphone, and instrument cables are extended and connected to the particular instruments. By extending and connecting the retracted cables, a musical production is readied in a relatively short period of time.

Upon completion of a performance, the retractable cable system enables a quick break down of the cables attached to the performance equipment. To store a cable for a future performance, the connector attached to the corresponding device, such as a microphone, is detached from the device and then the cable is extended a short distance with a smooth pulling motion. The retracting mechanism within the corresponding cable-reel is activated and the cable is automatically retracted into the housing. As a result, the time spent manually winding up cables and storing cables is greatly reduced.

Because the cable retractors are individually removable and interchangeable, different numbers and types of cables can be affixed within the housing depending on the application. Specifically, different sized performing groups can customize the cables to fit the particular needs of the group.

In an alternative embodiment, the retractable cable system can be equipped with multiple electrical connectors used to, for example, recharge a fleet of electrical cars, such as golf carts. In addition, the size of the quick cable system can be scaled up or down, depending on the particular application with, for example, larger reels and longer cables.

While the present invention has been illustrated and described with reference to particular embodiments, it will be appreciated that the present invention is not limited to these particular examples, rather, the scope of protection of the present invention is to be determined solely from the attached claims.

What is claimed is:

1. An electrical cable system comprising:
   a housing; and
   a first plurality of individually removable retractable cable-reels attached within said housing, each of said individually removable retractable cable-reels having a corresponding electrical cable with a first connection end and a second connection end, wherein said electrical cables are electrically independent from each other such that one of said individually removable retractable cable-reels and corresponding electrical cables can be removed from said housing without affecting capacities of remaining said electrical cables to form electrical connections, each said first connection end extending from a corresponding one of said retractable cable-reels by a non-retractable length of said electrical cable, each said second connection end extending from said corresponding one of said retractable cable-reels and said housing by an extendible and retractable length of electrical cable, said second connection ends including at least two dissimilar connector types, wherein said electrical cables that correspond to said individually removable retractable cable-reels are electrically independent of each other such that electrical current cannot be passed between said electrical cables.

2. The system of claim 1 wherein each of said first connection ends extend out of said housing.

3. The system of claim 1 wherein each of said first connection ends extend to said housing such that said connection ends are connectable with compatible connection ends from outside said housing.

4. The system of claim 1 wherein said electrical cables include at least two dissimilar cable types.

5. The system of claim 1 wherein said housing has brackets that extend from outer edges of said housing and that align with mounting brackets of a standard 19-inch audio component rack system.

6. The system of claim 1 further comprising a second plurality of individually removable retractable second cable-reels attached within said housing, each of said individually removable retractable second cable-reels having a corresponding electrical cable with a first connection end and a second connection end, said first connection end extending from a corresponding one of said retractable second cable-reels by a non-retractable length of said electrical cable, said second connection end extending from said corresponding one of said retractable second cable-reels and said housing by an extendible and retractable length of electrical cable;
   wherein said first plurality of retractable cable-reels is attached in a first row aligned along a first axis of rotation and said second plurality of retractable second cable-reels is attached in a second row aligned along a second axis of rotation, said second row of retractable second cable-reels being off-set from said first row of retractable cable-reels such that said first plurality of corresponding electrical cables extends from said housing in a different location than said second plurality of corresponding electrical cables extends from said housing.

7. The system of claim 1 wherein said first connection ends are specific to connection to audio mixing equipment and said second connection ends are specific to connection to musical performance equipment.

8. An electrical cable system comprising:
   a housing that is connectable to a standard 19-inch audio component rack wherein said housing has brackets that extend from outer edges of said housing and that align with mounting brackets of said standard 19-inch audio component rack; and
   a first plurality of individually removable retractable cable-reels attached within said housing, each of said individually removable retractable cable-reels having a corresponding electrically independent electrical cable with a first connection end and a second connection end, wherein said electrical cables are electrically independent from each other such that one of said individually removable retractable cable-reels and corresponding electrical cables can be removed from said housing without affecting capacities of remaining said electrical cables to form electrical connections, each said first connection end extending from a corresponding one of said retractable cable-reels by a non-retractable length of said electrical cable for connection to separate connectors of an audio component that is connectable to said standard 19-inch audio component rack, each said second connection end extending from said corresponding one of said retractable cable-reels and said housing by an extendible and retractable length of electrical cable, said second connection ends including at least two dissimilar connector types for connection to musical performance equipment, said electrically independent electrical cables including at least two dissimilar cable types.

9. The system of claim 8 wherein each of said first connector ends extend out of said housing.

10. The system of claim 8 wherein said plurality of electrical cables includes at least one each of a two-conductor shielded cable, a two-conductor unshielded cable, and a one-conductor shielded cable.

11. The system of claim 8 wherein said first connection ends are electrically connected to an audio mixer that is connected to said standard 19-inch audio component rack.

* * * * *